United States Patent
Klotz et al.

(10) Patent No.: US 10,537,989 B2
(45) Date of Patent: Jan. 21, 2020

(54) VERTICAL ACCUMULATION IN A TREATMENT LINE

(71) Applicant: SIDEL CANADA INC., Laval (CA)

(72) Inventors: Franck Klotz, Laval (CA); Paulo Arruda, Laval (CA)

(73) Assignee: SIDEL CANADA, Laval (CA)

(*) Notice: Subject to any disclaimer, the term of this patent is extended or adjusted under 35 U.S.C. 154(b) by 47 days.

(21) Appl. No.: 15/572,836

(22) PCT Filed: May 11, 2015

(86) PCT No.: PCT/IB2015/000664
§ 371 (c)(1),
(2) Date: Nov. 9, 2017

(87) PCT Pub. No.: WO2016/181178
PCT Pub. Date: Nov. 17, 2016

(65) Prior Publication Data
US 2018/0141207 A1    May 24, 2018

(51) Int. Cl.
| | | |
|---|---|---|
| B65G 1/04 | (2006.01) | |
| B65G 47/51 | (2006.01) | |
| B25J 9/00 | (2006.01) | |
| B65G 61/00 | (2006.01) | |
| B65G 57/00 | (2006.01) | |
| B65G 65/00 | (2006.01) | |

(Continued)

(52) U.S. Cl.
CPC ........ *B25J 9/0093* (2013.01); *B65G 47/5104* (2013.01); *B65G 47/5181* (2013.01); *B65G 57/00* (2013.01); *B65G 61/00* (2013.01); *B65G 65/005* (2013.01); *B65G 65/02* (2013.01); *B65B 35/54* (2013.01)

(58) Field of Classification Search
CPC ...... F25D 25/02; A47B 57/06; B65G 47/5154
See application file for complete search history.

(56) References Cited

U.S. PATENT DOCUMENTS

| | | | | |
|---|---|---|---|---|
| 1,403,486 A | * | 1/1922 | Cooney ..................... | B66F 9/07 187/244 |
| 1,854,341 A | * | 4/1932 | Laussucq .................. | D21J 1/00 100/195 |

(Continued)

FOREIGN PATENT DOCUMENTS

| | | |
|---|---|---|
| EP | 1144285 B1 | 7/2002 |
| EP | 1497208 B1 | 9/2006 |

(Continued)

OTHER PUBLICATIONS

International Search Report, dated Feb. 9, 2016, from corresponding PCT/IB2015/000664 application.

*Primary Examiner* — Gregory W Adams (57) ABSTRACT

Disclosed is an accumulation device, for accumulating products conveyed within an industrial treatment line, including a set of horizontal trays, arranged in a tray zone as a vertical stack, further including a manipulator, such as a robot, for transferring products between a substantially horizontal closed belt type conveyor and the uppermost tray of the bottom portion of the stack. The trays are movable in the vertical direction, at least in order to bring at a predetermined height the tray to be loaded or unloaded. Also disclosed is a corresponding conveying installation and method.

20 Claims, 6 Drawing Sheets

(51) Int. Cl.
*B65G 65/02* (2006.01)
*B65B 35/54* (2006.01)

(56) References Cited

U.S. PATENT DOCUMENTS

| | | | |
|---|---|---|---|
| 3,668,819 A * | 6/1972 | Henshaw | B65B 31/027 53/102 |
| 3,982,801 A * | 9/1976 | Heidorn | A47B 57/06 312/306 |
| 4,609,091 A * | 9/1986 | Dorner | B65G 47/5154 198/347.3 |
| 5,024,593 A * | 6/1991 | Hehl | B29C 45/1756 414/331.14 |
| 5,038,916 A * | 8/1991 | Quilliou | F25D 25/04 198/429 |
| 5,056,239 A * | 10/1991 | Corner | C14B 1/58 34/242 |
| 5,799,588 A * | 9/1998 | Engel | A47B 57/06 108/108 |
| 5,855,104 A * | 1/1999 | Schlagel | B65B 25/008 53/495 |
| 5,868,545 A * | 2/1999 | Kasai | B23P 19/001 414/331.12 |
| 6,065,821 A * | 5/2000 | Anderson | A47B 57/06 108/108 |
| 6,516,935 B1 * | 2/2003 | McLennan | B23P 19/001 198/346.1 |
| 6,647,616 B1 | 11/2003 | Matsumura et al. | |
| 6,681,916 B2 | 1/2004 | Hiroki | |
| 7,232,025 B1 | 6/2007 | Warren et al. | |
| 7,264,108 B2 * | 9/2007 | Borsarelli | B65G 47/82 198/429 |
| 7,637,712 B2 * | 12/2009 | Varney | B07C 3/008 198/347.2 |
| 7,934,355 B2 * | 5/2011 | Strub | A61J 1/035 198/428 |
| 8,075,237 B2 * | 12/2011 | Webster | E04H 6/18 187/205 |
| 8,210,626 B2 * | 7/2012 | Shin | F25D 25/04 108/108 |
| 8,480,348 B2 | 7/2013 | Hyobu et al. | |
| 8,616,388 B2 * | 12/2013 | Butler | A47B 43/00 108/106 |
| 8,657,392 B2 * | 2/2014 | Fabbro | F25D 23/00 312/408 |
| 9,266,674 B2 * | 2/2016 | Reimer | B65G 1/026 |
| 2004/0096303 A1 * | 5/2004 | Resta | B65G 1/0435 414/331.13 |
| 2005/0178640 A1 | 8/2005 | Petrovic | |
| 2010/0193330 A1 | 8/2010 | Petrovic et al. | |
| 2012/0132503 A1 | 5/2012 | Petrovic | |
| 2004/0308107 | 10/2014 | Nickles | |

FOREIGN PATENT DOCUMENTS

| | | |
|---|---|---|
| EP | 2188199 B1 | 12/2012 |
| EP | 2459472 B1 | 7/2013 |
| EP | 2451732 B1 | 12/2013 |
| JP | S6056730 A | 4/1985 |

* cited by examiner

VERTICAL ACCUMULATION IN A TREATMENT LINE

The current invention belongs to the domain of conveying products in an industrial treatment line, comprising a sequence of treatment machines between which products to be treated are conveyed. The object of the present invention is an accumulation device that can be installed in such a treatment line, a conveying installation comprising such an accumulation device, as well as a conveying process.

In the domain of the present invention, a treatment line should be working with a constant output rate, as high as possible. It is therefore necessary to avoid that a stop occurring on one machine would block the surrounding machines. A treatment line is therefore usually provided with accumulation solutions between treatment machines, in order to let the preceding and subsequent machines work, even in case of a stop for a machine between them.

Accumulation solutions exist based on a bulk conveying. In these embodiments, it is first necessary to shift from a single row conveying to a bulk conveying, then to accumulate the products organized as bulk, and then to shift again the bulk organization to a single column conveying, just as, for example, disclosed in EP2188199 or EP1497208. Such a splitting and merging of the product flow needs space. Furthermore, the solutions needed for accumulating products organized in bulk also needs much space. For example, EP2459472 proposes an accumulation table in which the products enter on a first bulk conveyor, are transferred by a moving transversal guide to a second bulk conveyor, bringing the products to the exit of said table.

EP1144285 discloses an accumulation table in which the product input and the product output are located at opposed end of said table.

EP2451732 proposes a solution for accumulating products in a single column. A closed loop conveyor is arranged with a central moving element, the position of which defines the active length of said conveyor. Moving said central element increases or decreases the active length, thereby loading or unloading products, even with or without moving the conveyor portion after or before the central element. However, guiding the products is difficult, thereby reducing the maximum speed.

A constant problem of accumulation solutions is the corresponding footprint. There is a need for reliable accumulation solutions having a decreased footprint for equivalent accumulation capacity, or an increased capacity for an equivalent footprint. Such accumulation solutions should be reliable, thereby reducing the risk of stops, product falling, etc., and also compatible with high conveying rates. They should also be easily implemented on already existing treatment lines.

In order to reach this, the invention proposes to accumulate products on superimposed horizontal surfaces moving up or down along a single vertical axis. Products can be containers, packs, boxes, etc.

According to the invention, there is provided an accumulation device, for accumulating products conveyed within an industrial treatment line, comprising a set of horizontal trays, arranged in a tray zone as a vertical stack, further comprising a manipulator, such as a robot, for transferring products between a substantially horizontal closed belt type conveyor and the uppermost tray of the bottom portion of the stack.

This device is characterized in that said trays are movable in the vertical direction, at least in order to bring at a predetermined height the tray to be loaded or unloaded.

There is also provided a corresponding conveying installation comprising a continuous product conveying means based on a moving closed belt principle, on which the products stand in at least one column, and also comprising an accumulation device as defined, located at a side of the conveying means so that the manipulator can transfer the products between the trays and the conveying means.

There is also provided a corresponding method, which is a conveying process for products to be treated in an industrial treatment line, comprising conveying the products in the treatment line by conveying means on which they stand. This process is characterized in that it further comprises accumulating products from the conveying means by both moving a manipulator to extract products from the conveying means and to transfer them on a fixed horizontal tray on which the products can stand for accumulation and lifting at least one tray of products, and also releasing products onto the conveying means by both moving said manipulator to extract products from a horizontal tray on which products are accumulated and to transfer them onto the conveying means and moving down at least one tray of products to unload, in order to bring it at a predefined height, and wherein the trays are located in the same zone when being loaded and unloaded.

Further features and advantages of the present invention will be better understood from the description of preferred embodiments, which is given below by way of a non-limiting illustration, with reference to the accompanying drawings, in which.

A first object of the present invention is an accumulation device 1, for accumulating products 2 conveyed within an industrial treatment line, comprising a set of horizontal trays 3, arranged in a tray zone 19 as a vertical stack 6, further comprising a manipulator 4, such as a robot, for transferring products 2 between a substantially horizontal closed belt type conveyor 5 and the uppermost tray 3 of the bottom portion of the stack 6. The products 2 are moved by a conveyor 5 within the treatment line, especially a packaging line. They can be containers, bottles, jars, or even cases, boxes, packs, etc.

The accumulation device 1 is here to cope with the differences of flow rate between at least two machines of the treatment line. Having an accumulation area built as a stack of trays 3 reduces the global footprint of the accumulation device 1. In fact, as will be clear from the description hereunder, the trays 3 are always on the top of each other, separated by a distance depending on the presence or absence of products 2, and only moved along a vertical axis.

The manipulator 4 aims at transferring the products 2 between the conveyor 5 and one of the trays 3. In the accumulation phase, when the accumulation device 1 is getting filled with products 2, said products 2 are transferred from the conveyor 5 to a tray 3. In the release phase, when the accumulation device 1 is emptied, products are transferred from a tray 3 to the conveyor 5. The tray 3 on which the products 2 are loaded or unloaded is named the operative tray 3. The accumulation device 1 is such that loading or unloading of tray 3 is achieved in the same place. The tray 3 does not have to be moved if the accumulation flow suddenly has to be inversed from loading to unloading. The trays 3 always form a vertical stack 6.

From a general standpoint, the manipulator 4 therefore transfers the products 2 between the conveyor 5 and the operative tray 3, whatever its height is. It is clear that the tool 16 of the manipulator 4 can be movable in the vertical direction, to cope with any difference of height between the operative tray 3 and the conveyor 5. The manipulator 4 would be compatible with a set of trays 3 which are fixed in the vertical direction.

It order to keep the system simple at least in terms of manipulator 4 control, it is proposed to locate the operative tray 3 at a predefined height. At least the new operative tray 3 is therefore brought at this predefined height. Advantageously, said predefined height corresponds approximately to the height of the conveyor 5, so that the movement of the manipulator 4 can be optimal both during the loading and unloading phases.

Therefore, according to the invention, said trays 3 are movable in the vertical direction, at least in order to bring at a predetermined height the tray 3 to be loaded or unloaded, i.e. the operative tray 3, for either loading or unloading.

In some embodiments, the stack 6 of trays 3 is of a fixed configuration, and is moved up or down as a single element. The spacing between two successive trays 3 is therefore fixed and bringing the new operative tray 3 at the predetermined height has no effect on said spacing. The complete stack 6 is brought up or down, the vertical movement corresponding to the one needed to bring the operative tray 3 at the predetermined height. In such embodiments, the distance between the trays 3 is fixed.

In some other embodiments, the trays 6 are moved independently so that, for accumulating purposes, the uppermost tray 3 of the bottom portion of the stack 6, once full of products 2, is lifted and separated from the rest of said bottom portion, giving thereby access to the tray 3 directly underneath, on the top of the bottom portion of the stack 6, for further accumulating products 2 thereon. The ability to move each tray 3 independently also makes the accumulation device 1 more versatile and easily usable for different heights of products 2. It is clear that moving the loaded tray 3 up separates the stack 6 in a bottom portion and a top portion, the operative tray 3 being located at the top of the bottom portion. It should be noted here that lifting the tray 3 can be done even if the tray 3 is not completely full of products 2. Lifting the tray 3 can be triggered when a predefined quantity of product 2 has been transfer to the tray 3.

According to an additional possible feature, the manipulator 4 simultaneously transfers a batch of at least two products 2, said batch approximately corresponding to a lateral dimension of the tray 3. Treating batches of products 2 rather than products 2 themselves gives more time to the manipulator 4 for its movement. While the manipulator 4 transfers a batch, the conveyor 5 moves either the preceding one, for an unloading phase, or the next one, for a loading phase.

Figure 3:
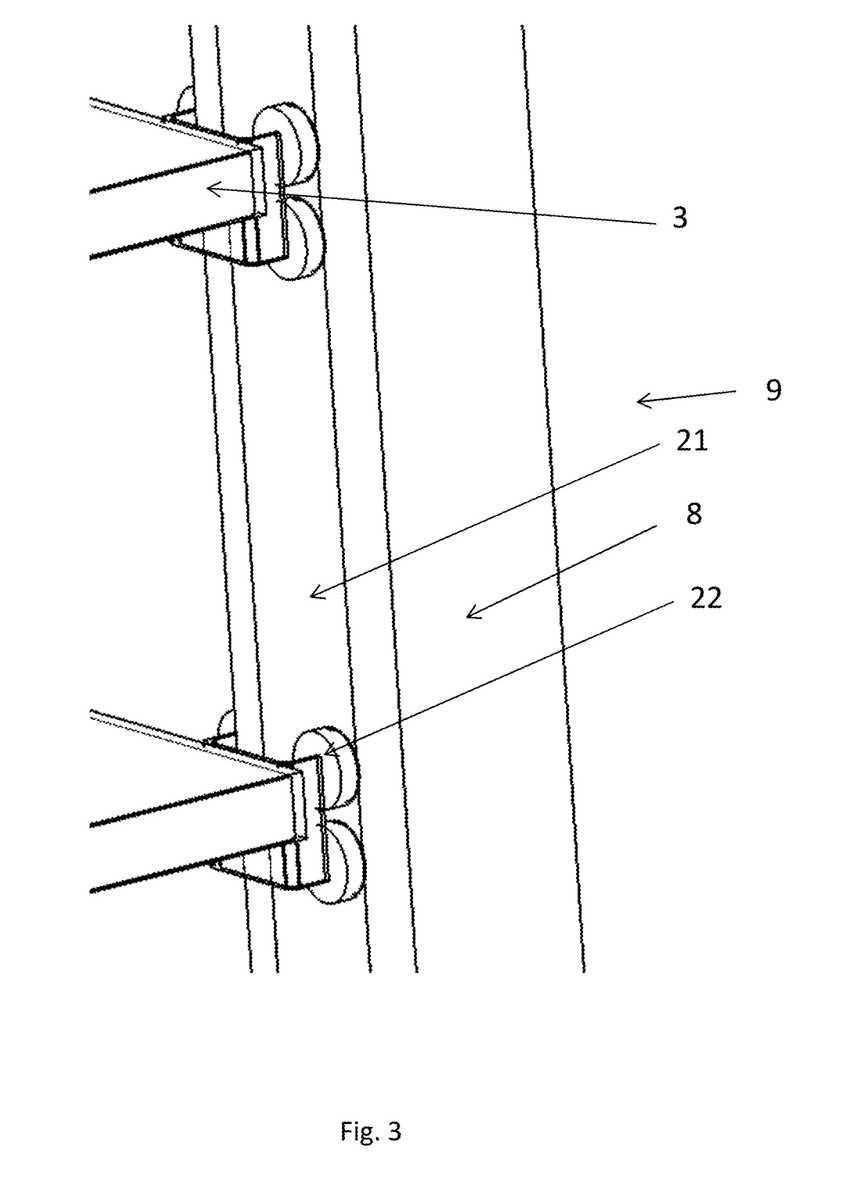
FIG. 3 is a detailed view of the tray guiding system.

According to another additional possible feature, the accumulation device 1 comprises a frame 7 with vertical supporting pillars 8 on which the trays 3 are mounted with corresponding sliding means 9, for example rollers or linear slides, as seen FIG. 3. The frame 7 can be as a cage in which the trays 3 are located. The frame 7 surrounds the tray zone 19, so that the trays 3 move in the frame 7. The frame 7 is the structure along which the trays 3 can move, together or each one separately. The trays 3 are movably mounted in the frame 7, preferably at the level of the pillars 8, with sliding means described hereunder. Trays 3 move up and down in this frame 7, extending in the vertical direction.

Figure 4:
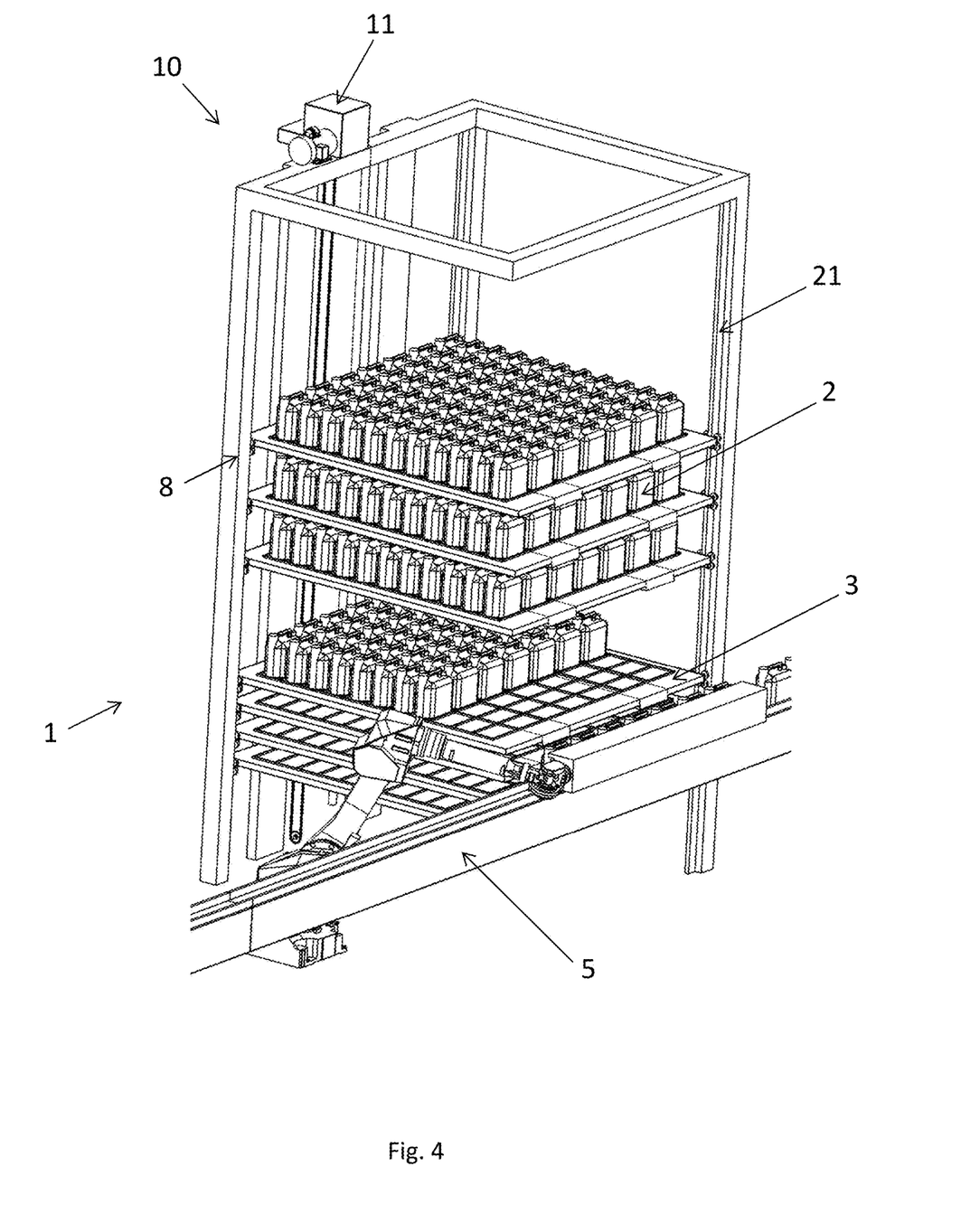
FIG. 4 shows a conveying installation with an accumulation device partially loaded.

According to another additional possible feature, the trays 3 have a substantial rectangular shape, supporting pillars 8 being located at the corners thereof. As can be seen from the drawings, for example FIG. 4, one corner of each tray 3 is however preferably free. Also, the frame 7 has vertical beams located along a side of the trays 3, rather than at a corner thereof. Such a shape of the trays 3 makes it possible to put the batches of products 2 one next to the other. The density of products 2 on each tray 3 is therefore optimal, as a batch mainly corresponds to one side of the tray 3, and the other side corresponds to the accumulation of batches.

According to another possible additional feature, the frame 7 and the manipulator 4 are located side by side, the frame 7 being open for creating a lateral access for the manipulator 4, the frame 7 having, for example, three supporting pillars 8 at the corners of the trays 3, the manipulator 4 being located at the level of the free tray corners 3. From a top view, the manipulator 4 and the frame 7, defining the tray zone 19, are located at the same side of the conveyor 5. This reduces the amplitude needed for the manipulator 4. Also, there is no risk of collision once the tool 16 of the manipulator 4 has been removed from the top of the conveyor 5. Alternatively, the manipulator 4 can be located at the other side of the conveyor 5, and is therefore preferably able to reach the farthest opposite side of the operative tray 3.

Figure 5:
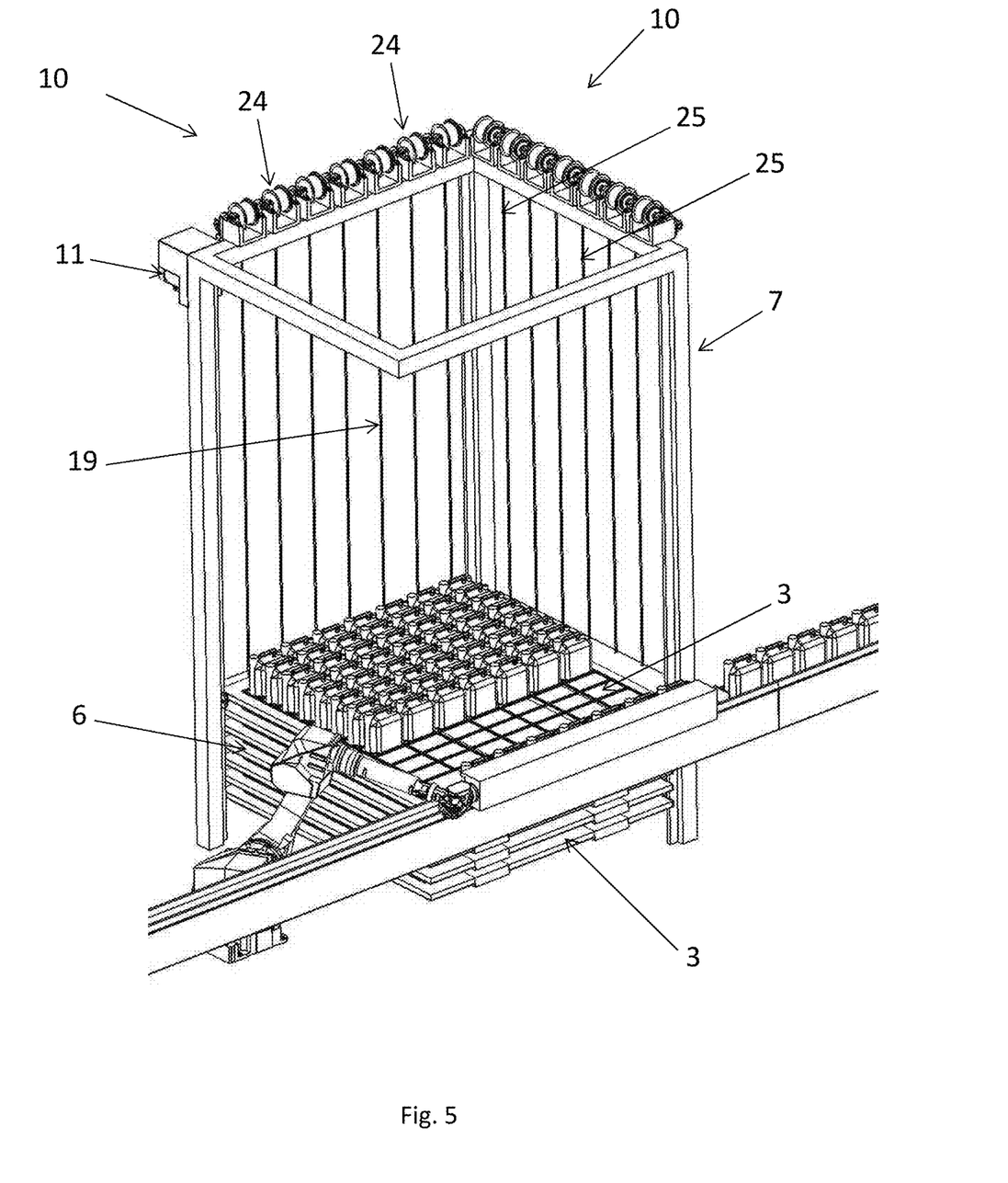
FIG. 5 shows the operation for the uppermost tray, with a belt based actuation means.

As already said, in some embodiments, the stack 6 of trays 2 has a fixed configuration and is brought up or down as a fixed assembly. In some other embodiments, each tray 3 can be moved independently in the vertical direction. Therefore, according to another additional possible feature, the accumulation device 1 further comprises an actuation means 10, able to move up or down each tray 3 separately. The actuation means 10 is controllable for controlling the movement of each tray 3 separately. Of course, it is still possible to move each tray 3 with the same displacement, leading to bringing up or down the whole stack 6 as an assembly of fixed dimensions. The accumulation device 1 preferably comprises only one actuation means 10, as can be seen for example from FIGS. 1, 2 and 4. FIG. 5 shows for example an accumulation device 1 with two separate actuation means 10.

According to another possible feature, the actuation means 10 comprises a single motor 11 and a set of controlled clutches 12, one for each tray 3, for generating the vertical movement of the trays 3. The vertical movement of each tray 3 comes from the operation of the same source, here a motor 11. Different mechanisms can be designed for transforming the rotational movement of the motor 11 in the vertical movement of the trays 3. Two mechanisms are described hereunder, with either a threaded axle 20 or a reel 24 and cable means 25.

The use of controlled clutches 12 makes it possible to have a single source of movement and to transfer this movement in a controlled way to one single tray 3, some trays 3 of the stack 6, or the whole stack 6. It is therefore possible, for example, to adjust the spacing between the trays 3 for a new product 2 format, and then, once tuned, to move the whole trays 3 simultaneously. From a general standpoint, a transmission assembly 13 is associated to each tray 3, said transmission assembly 13 being controllable thanks to its clutch 12. The transmission assembly 13 is mounted between the tray 3 and the motor 11.

Figure 2:
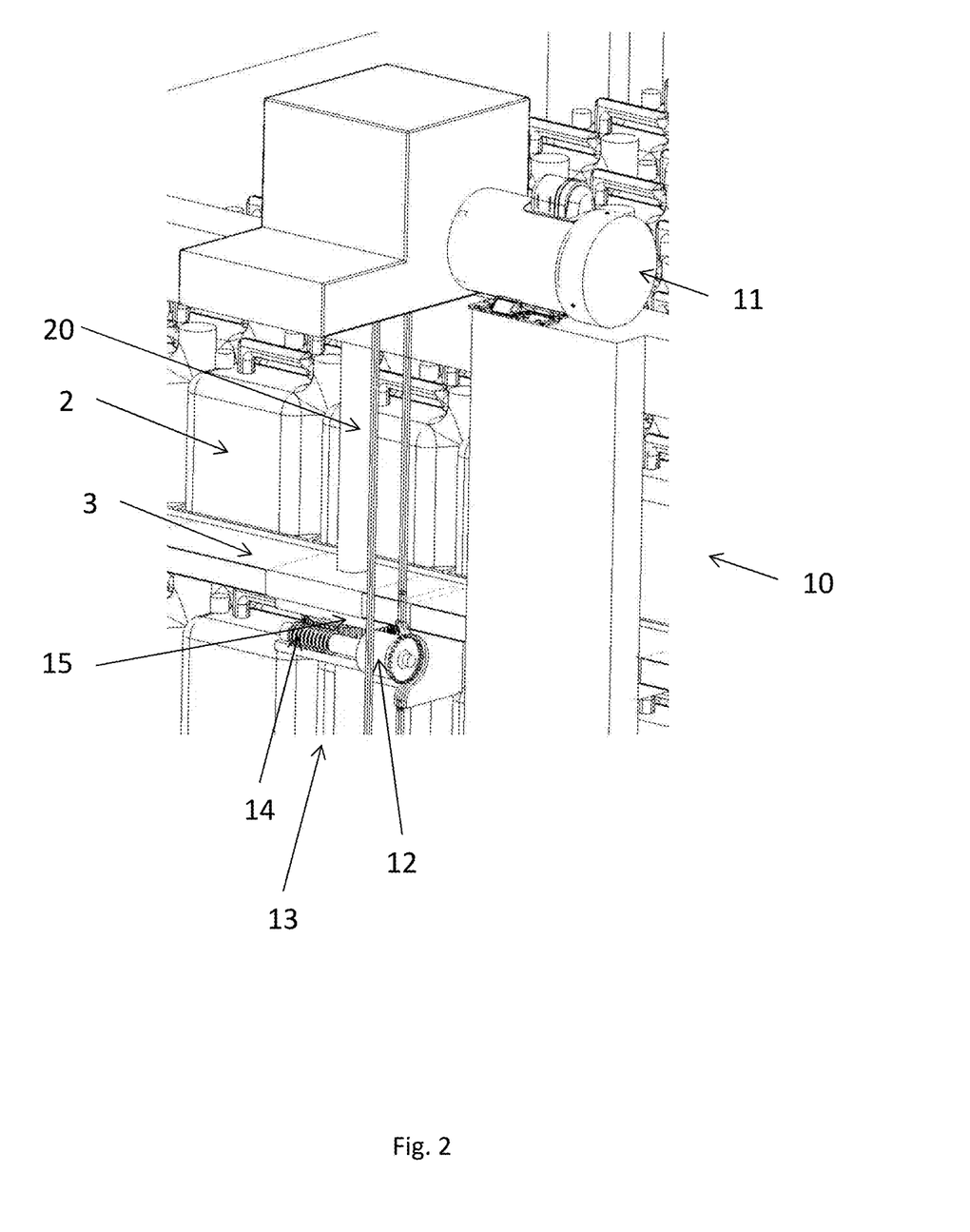
FIG. 2 shows the solution to move each single tray in the vertical direction.

In some embodiments, illustrated in FIG. 2, a threaded axle 20 of the accumulation device 1 extends in the vertical direction and the actuation means 10 comprises, for each tray 3, at the output of the corresponding clutch 12, a transmission assembly 13 comprising a worm gear 14, driven by the output of the clutch 12, and a double gear 15, engaged by said worm gear 14 on its outer teeth and engaged on the threaded axle 20 on its inner thread. The vertical movement of a tray 3 is therefore obtained by the controlled rotation of a nut, or double gear 15, along a threaded axle 20, which is mounted in the frame 7. Said nut is movably attached to the tray 3, in order to be able to turn relative to the tray 3, but still to drive said tray 3 up or down.

Figure 6:
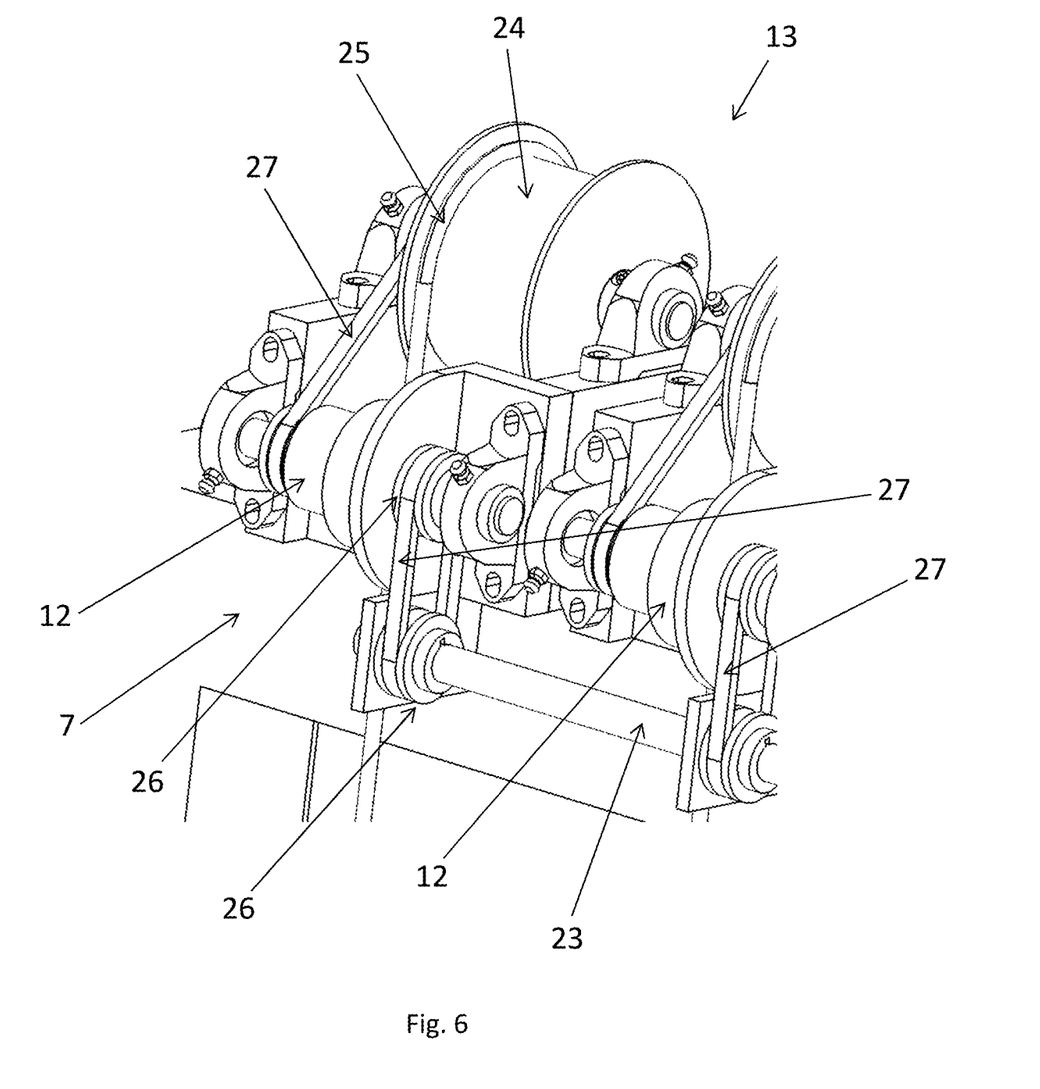
FIG. 6 shows a detail of the actuation means based on pulleys and belts.

In some other embodiments, illustrated in FIG. 6, the actuation means 10 comprises, driven by the motor 11, a single output shaft 23 for the set of trays 3, said shaft 23 engaging the input of each clutch 12, and further comprises, for each tray 3, at the output of the corresponding clutch 12, a reel 24, for winding or unwinding a cable means 25 linked to the corresponding tray 3. On said illustrating figure, the accumulation device 1 comprises two such actuation means 10. Each actuation means 10 has a transmission assembly 13 for each tray 3. Each tray 3 is therefore moved up or down thanks to the action of its own actuation means 10. It will be understood that having a plurality of actuation means 10 is possible, whatever its structure.

On FIG. 6, the actuation means 10 comprises a set of pulleys 26 and belts 27. A first pulley is mounted on the output shaft 23 and driven by said shaft 23. This first pulley drives a first belt, driving, in turn, a second pulley, at the input of the controlled clutch 12. A third pulley is located at the output of the controlled clutch 12, and engages a second belt 27. Said second belt 27 drives, in turn, a reel 24. The reel 24 receives a cable means 25 at its periphery. One end of the cable means 25 is fixed to the reel 24, and the other is fixed to a tray 3. Winding the cable means 25 leads to raising the tray 3 it is fixed to. Unwinding the cable means 25 leads to bringing the corresponding tray 3 down. The transmission assembly 13 further comprises a braking means, for holding the tray 3 at its vertical height.

According to another possible feature, the manipulator 4 comprises a robot located next to the stack 6 and having an arm 17 at the end of which a tool 16 is mounted, said tool 16 being designed for a mechanical engagement of at least one product 2 to be transferred, the tool 16 being movable along the whole top surface of the tray 3. The tool 16 can engage the products 12 by gripping, pushing, or sweeping, for example. The tool 16 preferably engages the product 2 at its top, but it is also possible to have the tool 16 engaging the product 2 at its bottom area, for example by inserting a surface between the product 2 and the supporting element. The robot illustrated in the attached drawings is made of a set of arms linked with rotational movement ability. It is also possible to have the tool 16 movable thanks to slides in a structure.

According to another possible additional feature, the accumulation device 1 further comprises counterweighting means, linked to the trays 3 and having an opposite vertical movement thereto, thereby reducing the energy required to lift a full tray 3.

It will be understood that the accumulation device 1 is very easy to introduce in an existing treatment line. No major redesign of the existing line and of its main component is needed.

A second object of the present invention is a conveying installation 18 comprising a continuous product 2 conveying means 5 based on a moving closed belt principle, on which the products 2 stand in at least one column, and further comprising an accumulation device 1 as described, located at a side of the conveying means 5 so that the manipulator 4 can transfer the products 2 between the trays 3 and the conveying means 5. The manipulator 4 and the accumulation device 1 are preferably arranged on the same side of the conveying means 5.

According to a possible additional feature, the conveying installation 18 comprises a stopping means, designed to temporarily stop the movement of the products 2 in order to make it easier for the manipulator 4 to pick them from the conveying means 5 and/or to put them onto the conveying means 5. This stopping means can simply be a stop, introduced between the products 2 while the conveyor 5 continues to move. This would simply stop the column of products 2, and let the conveyor 5 move in a continuous manner. Preferably, the conveying installation 18 has two such stopping means, a first one, downstream, for stopping the products 2 to be taken from the conveyor 2 in the loading phase, and another one, upstream, for stopping the products 2 flow, and thereby creating a free space for receiving products 2 from the tray 3 in the unloading phase.

In some embodiments, the stopping means is a controllable abutment element able to be introduced in the product 2 flow, in order to stop the products 2 without stopping the conveying means 5. After having introduced the abutment element, the product 2 would then slip on the conveyor 5.

A third object of the present invention is a conveying process for products 2 to be treated in an industrial treatment line, comprising conveying the products 2 in the treatment line by conveying means 5 on which they stand.

According to the invention, this process further comprises accumulating products 2 from the conveying means 5 by both moving a manipulator 4 to extract products 2 from the conveying means 5 and to transfer them on a fixed horizontal tray 3 on which the products 2 can stand for accumulation and lifting at least one tray 3 of products 2, for example in order to give access for the manipulator 4 to a tray 3 underneath for further product 2 transfer. As already said, raising the trays 3 can be done by raising simultaneously each tray 3 with the same displacement. Raising the trays 3 can also be done for each tray separately. In such cases, the lifted tray 3 is the uppermost tray 3 of the stack 6, or at least of the bottom portion of said stack 6. The top tray 3 is lifted once it has been filled with products 2 or at least once a predefined quantity of products 2 has been received.

This process also comprises
releasing products 2 onto the conveying means 5 by both moving said manipulator 4 to extract products 2 from a horizontal tray 3 on which products 2 are accumulated and to transfer them onto the conveying means 5 and moving down at least one tray 3 of products 2 to unload, in order to bring it at a predefined height, and wherein
the trays 3 are located in the same zone when being loaded and unloaded. Moving down the tray 3 at least gives access for the manipulator 4 to the products 2 located thereon. The tray 3 brought down is preferably the tray 3 at the bottom of the top portion of the stack 6.

Loading and unloading take place in the same area, so that the tray 3 has to be brought in said area, either for loading or unloading.

According to a possible feature, the conveying means 5 keep moving the products 2 while they are transferred by the manipulator 4 onto or from said conveying means 5, said manipulator 4 moving simultaneously with the conveying means 5. Therefore the tool 16 at the end of the manipulator 4 has the same movement than the conveyor 5 while extracting or bringing products 2. This can be helpful when stopping the products 2 flow might lead to product 2 damages.

In the embodiments shown in the attached drawings, the conveying installation 18 comprises a conveying means 5 for moving products 2 arranged in a single row. From a general standpoint, the present invention can be adapted for products 2 conveying as a plurality of parallel row.

The products 2 stand on the top surface of a belt type conveying means 5 and are moved by it in an industrial line, such as a packaging line. Treatment machines of such a line are subject to periodic stops, for maintenance or for other problems. It is therefore necessary to have buffers for receiving products while the subsequent treatment is impossible, or for providing products while the previous treatment is impossible.

The present invention proposes an accumulation solution with a high capacity and reduced footprint, flexible in case of format change, and reactive when shifting from accumulation to release.

The conveying installation 18 has an accumulation device 1 based on a vertical accumulation principle. The accumulation is made with trays 3 or plates, located at different height in a tray zone 19.

For accumulation purposes, products 2 are extracted from the conveying means 5, or conveyor 5, and put on the top surface of one of these trays 3.

The accumulation device 1 has at least two trays 3, superimposed in the tray zone 19. The preferred embodiment described hereunder is based on more than two, but can be easily adapted for only two trays 3.

The empty trays 3 first form a stack 6 in the bottom area of the tray zone 19, close to each other. Products 2 are transferred from the conveyor 5 to the top surface of the uppermost tray 3 of said stack 6. When the uppermost tray 3 is full of products 2 and still other products 2 need to be accumulated, the uppermost tray 3 is lifted in order to give access to the top surface of the tray 3 underneath. The new tray 3 to be loaded can be lifted in order to reach a predefined height, common for the loading operation.

This loading and lifting sequence is repeated as necessary. The stack 6 of trays 3 obtained has therefore two main portions. The bottom portion is a stack of empty trays 3, and the top portion is a stack of full trays 3. Of course, a bottom stack or a top stack can comprise only one single tray 3.

The vertical movement of the trays 3, in both directions, either to the top or to the bottom, is achieved along one single axis. Therefore, the trays 3 move in a vertical direction, along a single path, for both being lifted and lowered. This leads to a limited footprint of the accumulation device 1, compared to solutions with a closed loop accumulation circuit, in which the trays 3 are lifted along a first vertical axis, and later brought down along a second vertical axis, parallel, aside the first one, separated by a horizontal offset.

Therefore, the vertical movement to move the trays 3 up and the vertical movement to move the trays 3 down are superimposed with opposite directions, and there is no horizontal transfer of the trays 3 between loading and unloading. As a consequence, the sequence of trays 3 arriving for unloading is opposite to the sequence of trays 3 lifted after loading.

With such a principle, the accumulation device 1 is much more reactive and dynamic, because the shift from loading to unloading can be done instantaneously. There is no need to wait for a full tray 3 to arrive in a separated unloading zone. In the invention, loading and unloading is achieved in the same area, or work zone: after loading, trays 3 move from this work zone, and, for unloading, trays 3 come back in this work zone. A single manipulator 4 can be used for both loading and unloading, thereby leading to a simpler and more cost effective design.

As will be also described later on, the products 2 are transferred by batch from the conveyor 5 to a tray 3. Preferably, each batch of products 2 then forms a row, parallel to a side of the tray 3. The batches forming rows are deposited one next to the other, thereby leading to a matrix configuration for the products 2 on a tray 3. Consequently, the trays 3 have a substantial rectangular shape.

The trays 3 are slidably mounted on a frame 7 extending in the vertical direction and creating the tray zone 19. The frame 7 has a set of supporting pillars 8 on which the trays 3 are mounted and guided in their vertical movement. As will be understood from the coming description, the trays 3 are held by a threaded axle 20.

For such guiding purposes, the trays 3 can be fixed to the supporting pillars 8 by a set of slides or any other sliding means 9. As shown FIG. 3, a possible configuration for the sliding means 9 is based on a vertical rib 21 extending along the supporting pillar 8. Each tray 3 cooperates with this rib 21 thanks to a set of facing wheels 22. The tray 3 is then mounted so that the rib 21 is engaged between and by at least one couple of facing wheels 22, preferably two such couples.

The tray 3 is lifted, lowered, or held at a certain vertical height thanks to a fixed threaded axle 20 extending in the vertical direction. Each tray 3 has a double gear 15, with an inner thread and mounted on said threaded axle 20. Rotating this double gear 15 will therefore move it along the threaded axle 20, thereby moving said tray 3 up or down.

In order to shift products 2 from or to the trays 3, the accumulation device 1 also comprises a manipulator 4. This manipulator 4 could be a pusher for example, but is preferably based on an articulated robot with a tool 16 at the end of an arm 17 thereof. The tool 16 is adapted to handle simultaneously a plurality of products 2 creating a batch. As said before, a tray 2 can be loaded with many such batches.

The manipulator 4 preferably engages a product 2 batch from the top. The corresponding tool 16 can for example use the neck of the products 2 for cases in which the products 2 are containers, bottles, flasks or the like. The manipulator 4 has a movement which is preferably mainly horizontal, from the conveyor 3 to the uppermost tray 3 of the bottom stack for accumulating purposes, or from the lowest tray 3 of the upper stack to the conveyor 5 for unloading purposes. It will be understood that the movement of the manipulator 4 for loading and the movement for unloading are symmetric.

From a top view, the frame 7 is located at a side of the conveyor 5. The uppermost tray 3 of the bottom stack, which is to be loaded or unloaded with products 2 from or to the conveyor 5 is preferably located at the same height than the conveyor 5 itself. Therefore, the loading movement of the tool 16 is mainly horizontal, like a sweeping operation, pushing the products 2 from the conveyor 5 to the tray 3. Preferably the batch of products 2 is not turned around the vertical axis and products 2 are therefore put on the tray 3 by a simple horizontal linear movement perpendicular to the conveyor 5.

When starting a tray 3 loading, or finishing a tray 3 unloading, the manipulator 4 makes the longest transversal movement, from the conveyor 5 zone to the farthest side of the tray 3. It is therefore preferable to have the manipulator 4 next to the frame 7, located at the same side of the conveyor 5.

With such a configuration, the frame 7 and the manipulator 4 are one after the other in the conveyor 5 direction. In order to have a simple manipulator 5 design, it is proposed to have a frame 7 with an open structure at the manipulator 5 side. Thanks to such a structure, there is no vertical supporting pillar 8 preventing a horizontal movement for the manipulator 5. In fact, said manipulator 5 should be able to move freely along the complete surface of the tray 3.

Figure 1:
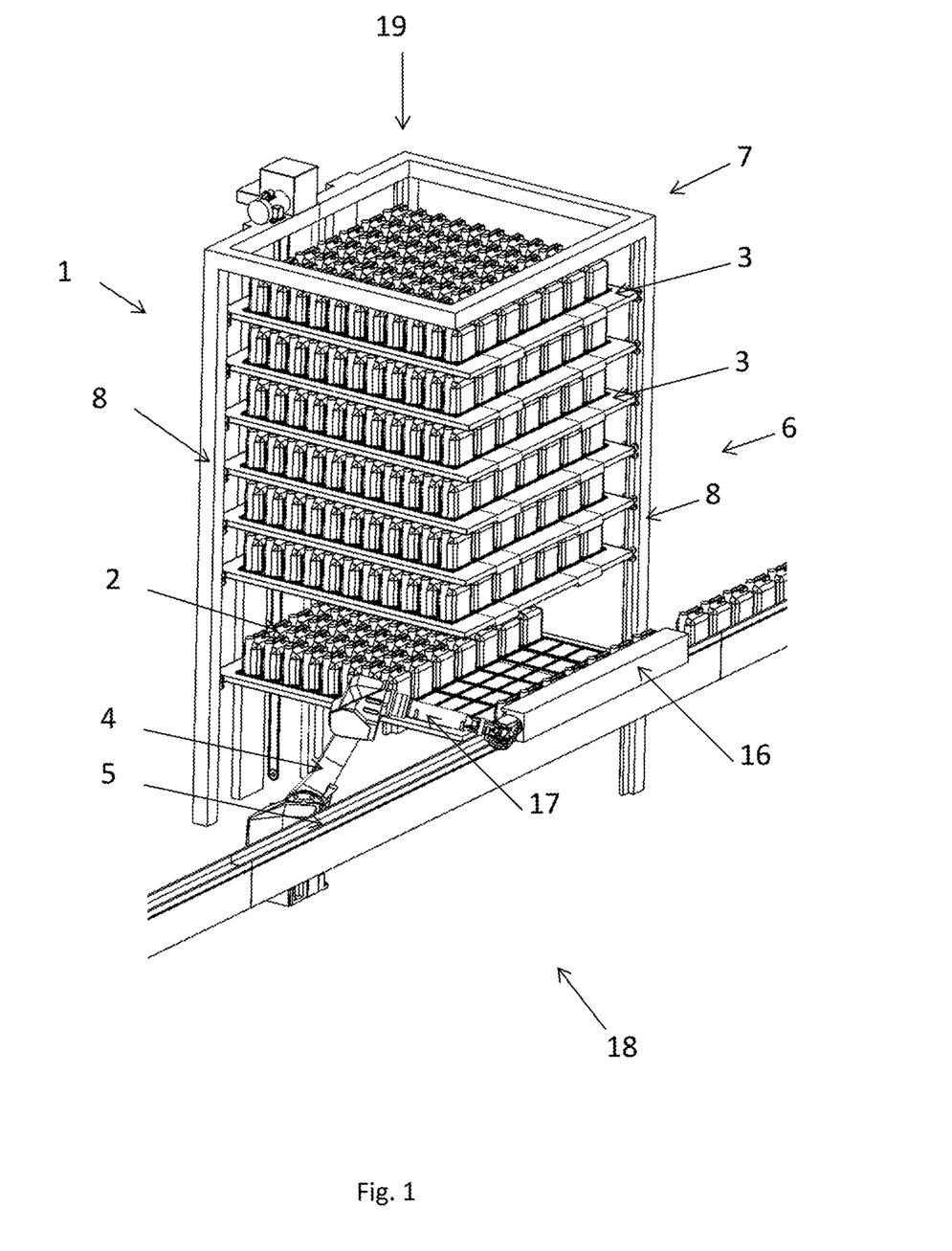
FIG. 1 shows a global view of a conveying installation according to the invention.

As shown FIG. 1, a tray 3 has a rectangular shape and the frame 7 has three main supporting pillars 8. Each supporting pillar 8 is located at a corner of the trays 3. The free corner of the trays 3 is located at the conveyor 5 side, near the manipulator 4, so that said manipulator 4 can easily move between the trays 3.

It is understood that, while accumulating, the batch could also be released at the closest area on the tray 3. The next batch would then simply push the accumulated batches to the farthest area of the tray 3. Also, the manipulator 4 and the trays 3 could be located such that the conveyor 5 runs between them: the manipulator 4 would be located at one side of the conveyor 5, while the trays 3 would be located at the other side.

Preferably, the accumulation device 1 is located next to a continuous conveyor 5, normally driving products 2 from an input zone to an output zone. Products 2 which are not extracted and transferred on the accumulation device 1 simply continue to be moved by the conveyor 5 to the next process stages. When there is a need for accumulating the products 2, the manipulator 4 engages a batch of products 2 and transfers it on a tray 3. Switching between accumulation, release, and a normal flow is therefore very easy.

While engaging the products 2, the manipulator 4 preferably moves at the same speed than the conveyor 5, thereby providing a tracking of the movement of the products 2. Synchronization of the movement of the manipulator 4 and the movement of the conveyor 5 is of course applicable for both loading and unloading the trays 3. Stopping the products 2 and/or the conveyor 5 is here unnecessary, but the manipulator 4 needs to be able to move fast enough compared to the time corresponding to the movement of the products 2 of the next batch.

In other embodiments, the conveyor 5 is stopped when products 2 to be transferred to the trays 3 arrive at the level of the manipulator 4 or when products 2 taken by the manipulator 4 are to be deposited on the conveyor 5. The manipulator 4 can then have a movement perpendicular to the conveyor 5 without any collision. Another solution is to introduce a stop in front of the products 2, without stopping the conveyor 5 itself. The fixed products 2 would then slip on the moving conveyor 5. This can also be used when transferring products 2 from the tray 3 to the conveyor 5: the stop is introduced and retracted once the manipulator 4 is disengaged.

An accumulation cycle can be described as follows. Batches of products 2 are first transferred from the conveyor 5 to the top surface of the uppermost tray 3 of the stack 6. As said before, a batch can be put either at the farthest free space or at the closest one, pushing the already transferred products 2 to the farthest free space. Once said uppermost tray 3 is full, it is lifted, at least for the manipulator 4 to have access to the top surface of the next tray 3. Preferably, the tray 3 is lifted to the top of the frame 7. The stack 6 of tray 3 is therefore divided in a top portion and in a bottom portion. The new uppermost tray 3 of the bottom stack is then preferably lifted at the working level, corresponding to the height of the preceding uppermost tray 3. The loading cycle can then continue until no other product 2 needs to be accumulated or until no remaining empty tray 3 is available. The total capacity of this accumulation device 1 is thereby defined by the total surface of the trays 3.

The unloading cycle is performed when the products 2 must be transferred from the trays 3 to the conveyor 5. The lowest tray 3 of the top portion of stack 6 is preferably first brought at the height of the working level. Then, the manipulator 4 engages a batch of products 2 standing on the tray 3 and transfer them on the conveyor 5. Each batch is then transferred, one after the other. Once the tray 3 is empty, it is preferably further lowered, eventually to the bottom of the frame 7, and the next tray 3 to be emptied is lowered to the working level. Lowering the lowest tray 3 of the upper stack is necessary at least to allow the manipulator 4 to engage the products 2 from the top thereof.

When the accumulation device 1 is only partially loaded, there is a stack of empty trays 3 in its bottom area, close to each other, and a stack of full trays 3 in its top area, separated at least by a distance corresponding to the height of the products 2. The uppermost tray 3 of the bottom stack is located at the working level. It will be understood that a tray 3 to be loaded or unloaded is first located at this predefined height, named working height, preferably corresponding to the height of the conveyor 5.

The vertical position of each tray 3 is controlled independently. This is necessary at least for moving up or down the tray 3 on which or from which the manipulator 4 transfers the products 2. This is also useful for adjusting the spacing between each couple of trays 3 in case the product 3 format has changed. Therefore, the accumulation device 1 has an actuation means 10 in order to move separately each tray 3 in the vertical direction.

In order to keep the system simple, it is proposed to have only one single source of movement for the whole set of trays 3. The movement is then transmitted to each tray 3 separately. As will be understood from the description hereunder, the movement can be transmitted to one single tray 3 or to a plurality of trays 3 simultaneously. The source of movement is preferably able to work in two opposite directions, one leading to lifting the trays 3, the other one leading to lowering them down.

The source of movement shown in the figures is a motor 11, preferably located at the top of the frame 7. The motor 11 is preferably a reversible brushless motor, of which the position is then completely controlled. The motor 11 drives a chain or equivalent transmission means, extending in the vertical direction.

Turning now to the trays 3, it should be noted that the vertical position of each tray 3 is defined by a double gear 15 attached thereto. This double gear 15 has outside teeth at its periphery, extending in the direction of its rotation axis. This double gear 15 also has a central hole provided with an inner thread, thanks to which it cooperates with a vertical threaded axle 20, mounted in the frame 7. As the double gear 15 is mounted to the tray 3, its rotation around the threaded axle 20 will lead to a linear movement of the whole tray 3 along said threaded axle 20. Moving a tray 3 up or down can therefore be achieved by turning the corresponding double gear 15 in one direction or in the opposite. This rotation of the double gear 15 comes from the motor 11 itself, as will explained hereunder.

For each tray 3, the accumulation device 1 comprises a worm gear 14, engaging the outside teeth of the double gear 15. This allows the transformation of the horizontal rotational axis, at the level of the worm gear 14, in a vertical rotational axis, at the level of the double gear 15, around the threaded axle 20. The worm gear 14 is moved by the output of a controlled clutch 12, the input of which is engaged by the chain or other transmission means driven by the motor 11. When the clutch 12 is locked, the rotation of the motor 11 is transferred to the chain or equivalent transmission means, then to the input gear of each controlled clutch 12, then to the output of said clutch 12, to the worm gear 14, and finally to the double gear 15.

The accumulation device 1 also has a control unit, at least for controlling the operation state of each clutch 12: if a clutch 12 is engaged, then the rotation of its input axle is transferred to its output axle; if a clutch 12 is disengaged, then the rotation of its input axle is not transferred to its output axle. The control unit therefore engages the clutch 12 of each tray 3 for which a vertical movement, either up or down, is desired. The tray 3 having an engaged clutch 12 will have both its worm gear 14 and its double gear 15 rotating, thereby causing a vertical movement of the tray 3 along the threaded axle 20.

One of the advantages of using a transmission assembly 13 with a worm gear 14 and double gear 15 subassembly is that the tray 3 is automatically blocked in the vertical position and no dedicated additional braking or blocking system is necessary.

It will be understood from what has been said that an actuation means 10 based on a single motor 11 can be used for moving each tray 3 independently. This is possible thanks to the controlled clutch 12 associated to each tray 3. Of course, for energy saving, mechanical balance or other reason, it is also possible to have a plurality of synchronized such actuation means 10.

FIGS. 5 and 6 focus on another embodiment for creating the vertical movement of the trays 3. Each tray 3 is held by a cable means 25, winding or unwinding on a turning reel 24. Turning this reel 24 thereby creates the vertical movement of the corresponding tray 3. This reel 24 is mounted at the output of a clutch 12, the input of which is driven by the motor 11. Hence, each tray 3 has a corresponding reel 24 and clutch 12. Belts 27 are used between the output shaft or the motor 11 and the input shaft of the clutch 12, and also between the output shaft of the clutch 12 and the reel 24. The winding of the cable means 25 on the reel 24 determines the vertical position of the corresponding tray 3.

With the invention as described, it is therefore possible to obtain an accumulation of high capacity with a limited footprint, very reactive, easily adapted to different product sizes and formats and easily implemented on existing conveying lines.

While specific embodiments of the invention have been described in detail, it will be appreciated by those skilled in the art that various modifications and alternatives to those details, in addition to those discussed above, could be developed in light of the overall teachings of the disclosure. Accordingly, the particular arrangements disclosed are meant to be illustrative only, and not limiting as to the scope of the invention which is to be given the full breadth of the claims appended in any and all equivalents thereof, including any combination of their features.

The invention claimed is:

1. Accumulation device, for accumulating products conveyed within an industrial treatment line, comprising:
   a threaded axle extending vertical from ground;
   a set of horizontal trays, arranged in a tray zone as a vertical stack;
   a manipulator for transferring products between a substantially horizontal closed belt type conveyor positioned at a height and a tray within he vertical stack; and
   an actuation means configured to generate vertical movement of each tray separately, the actuation means comprising:
      a motor,
      a set of clutches for each tray, and
      a transmission assembly, positioned at each set of clutches, the transmission assembly comprising:
         a worm gear, driven by the output of each clutch of the set of clutches, and
         a double gear, engaged by the worm gear a set of outer teeth and engaged on the threaded axle on an inner thread,
   wherein the vertical stack to be loaded or unloaded is positioned at a predetermined height corresponding to the height of the horizontal conveyor.

2. Accumulation device according to claim 1, wherein the manipulator simultaneously transfers a batch of at least two products, said batch approximately corresponding to a lateral dimension of the tray.

3. Accumulation device according to claim 2, wherein said accumulation device comprises a frame with vertical supporting pillars on which the trays are mounted with corresponding sliding means.

4. Accumulation device according to claim 1, wherein said accumulation device comprises a frame with vertical supporting pillars on which the trays are mounted with corresponding sliding means.

5. Accumulation device according to claim 4, wherein the trays have a substantial rectangular shape, supporting pillars being located at the corners thereof.

6. Accumulation device according to claim 5, wherein the frame and the manipulator are located side by side, the frame being open for creating a lateral access for the manipulator.

7. Accumulation device according to claim 4, wherein the frame and the manipulator are located side by side, the frame being open for creating a lateral access for the manipulator.

8. Accumulation device according to claim 1, wherein the manipulator comprises a robot and having an arm at the end of which a tool is mounted, said tool being designed for a mechanical engagement of at least one product to be transferred, the tool being movable along the whole top surface of the tray.

9. Conveying installation comprising a continuous product conveying means based on a moving closed belt principle, on which the products stand in at least one column, and further comprising an accumulation device according to claim 1, located at a side of the conveying means so that the manipulator can transfer the products between the trays and the conveying means.

10. Conveying installation according to claim 9, wherein the conveying installation temporarily stops the movement of the products in order to make it easier for the manipulator to pick them from the conveying means and/or to put them onto the conveying means.

11. Conveying installation according to claim 10, wherein the temporary stop of the movement of products is done without stopping the conveying means.

12. Conveying process for products to be treated an industrial treatment line, comprising:
   conveying the products in the treatment line by conveying means on which they stand;

accumulating products from the conveying means by both moving a manipulator to extract products from the conveying means and to transfer them on a fixed horizontal tray on which the products can stand for accumulation;

lifting at least one tray of products using an actuation means configured to generate vertical movement of each tray separately, the actuation means comprising a motor; a set of clutches for each tray; and a transmission assembly positioned at each set of clutches wherein the transmission assembly comprising a worm gear, driven by the output of each clutch of the set of clutches, and a double gear, engaged by the worm gear a set of outer teeth and engaged on a threaded axle extending vertical from ground on an inner thread; and, releasing products onto the conveying means by both moving said manipulator to extract products from a horizontal tray on which products are accumulated and to transfer them onto the conveying means and moving down at least one tray of products to unload, in order to bring the tray at a predefined height corresponding to the height of the conveying means, wherein the trays are located in proximity to the conveyor when being loaded and unloaded.

13. Conveying process according to claim 12 wherein the conveying means keep moving the products while they are transferred by the manipulator onto or from said conveying means, said manipulator moving simultaneously with the conveying means.

14. Accumulation device, for accumulating products conveyed within an industrial treatment line, comprising:

a set of horizontal trays, arranged in a tray zone as a vertical stack;

a manipulator for transferring products between a substantially horizontal closed belt type conveyor positioned at a height and a tray within the vertical stack; and an actuation means configured to generate vertical movement of each tray separately, the actuation means comprising:
a motor,
a set of clutches for each tray,
an output shaft engaging an input of each clutch of the set of clutches, and
a reel for winding and unwinding a cable for each tray, the reel positioned at an output of each clutch of the set of clutches, wherein the vertical stack to be loaded or unloaded is positioned at a predetermined height corresponding to the height of the horizontal conveyor.

15. Accumulation device according to claim 14, wherein the manipulator simultaneously transfers a batch of at least two products, said batch approximately corresponding to a lateral dimension of the tray.

16. Accumulation device according to claim 14, wherein said accumulation device comprises a frame with vertical supporting pillars on which the trays are mounted with corresponding sliding means.

17. Accumulation device according to claim 16, wherein the substantial rectangular shape, supporting pillars being located at the corners thereof.

18. Accumulation device according to claim 16, wherein the frame and the manipulator are located side by side, the frame being open for creating a lateral access for the manipulator.

19. Accumulation device according to claim 14, wherein the manipulator comprises a robot and having an arm at the end of which a tool is mounted, said tool being designed for a mechanical engagement of at least one product to be transferred, the tool being movable along the whole top surface of the tray.

20. Conveying installation comprising a continuous product conveying means based on a moving closed belt principle, on which the products stand in at least one column, and further comprising an accumulation device according to claim 14, located at a side of the conveying means so that the manipulator can transfer the products between the trays and the conveying means.

* * * * *